US008681610B1

(12) United States Patent
Mukerji (10) Patent No.: US 8,681,610 B1
(45) Date of Patent: *Mar. 25, 2014

(54) TCP THROUGHPUT CONTROL BY IMPOSING TEMPORAL DELAY

(71) Applicant: F5 Networks, Inc., Seattle, WA (US)

(72) Inventor: Arindum Mukerji, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,735

(22) Filed: Jan. 30, 2013

Related U.S. Application Data

(63) Continuation of application No. 11/670,410, filed on Feb. 1, 2007, now Pat. No. 8,379,515.

(51) Int. Cl.
*G01R 31/08* (2006.01)

(52) U.S. Cl.
USPC .......................................................... 370/229

(58) Field of Classification Search
USPC .......................................................... 370/229
See application file for complete search history.

(56) References Cited

U.S. PATENT DOCUMENTS

| 5,426,635 | A | 6/1995 | Mitra et al. |
| 6,215,769 | B1 | 4/2001 | Ghani et al. |
| 6,252,851 | B1 | 6/2001 | Siu et al. |
| 6,622,172 | B1 | 9/2003 | Tam |
| 6,741,555 | B1 | 5/2004 | Li et al. |
| 6,981,014 | B2 | 12/2005 | Jayam et al. |
| 7,369,498 | B1 | 5/2008 | Ma et al. |
| 8,379,515 | B1 * | 2/2013 | Mukerji ........................ 370/229 |
| 2003/0179720 | A1 | 9/2003 | Cuny |
| 2005/0210122 | A1 | 9/2005 | Taylor et al. |
| 2007/0297414 | A1 | 12/2007 | Gupta et al. |
| 2010/0274872 | A1 | 10/2010 | Harrang et al. |

OTHER PUBLICATIONS

"Transmission Control Protocol—DARPA Internet Program Protocol Specification," Sep. 1981, pp. 1-91, Information Sciences Institute, Marina del Rey, California, http://tools.ietf.org/html/rfc793.
Ramakrishnan, et al., "The Addition of Explicit Congestion Notification (ECN) to IP," Sep. 2001, pp. 1-49, Network Working Group, http://www.apps.ietf.org/rfc/rfc3168.html.
Stevens, "TCP Slow Start, Congestion Avoidance, Fast Retransmit, and Fast Recovery Algorithms," Jan. 1997, pp. 1-5, Network Working Group, http://www.apps.ieft.org/rfc/rfc2001.html.

(Continued)

*Primary Examiner* — Mark Rinehart
*Assistant Examiner* — Gbemileke Onamuti
(74) *Attorney, Agent, or Firm* — Frommer Lawrence & Haug LLP; Jamie L. Wiegand (57) ABSTRACT

A system, apparatus, and method are directed towards managing traffic over a network by imposing temporal delays in acknowledgments (ACKs). A Traffic Management Device (TMD), interposed between two network session end-points monitors a buffer of relayed packets. If the contents of the buffer exceed a threshold value, delays are imposed on sending of acknowledgements. If the buffer contents exceed the threshold, and the buffer's contents are increasing, the delays may be increased. If the buffer's contents are about at steady state, the acknowledgement delays may be decreased, or maintained at a current delay status. In one embodiment, if the sender is sending packets at a rate above a receiver's ability to receive the packets, and the sender appears not to be decreasing its rate of transmission, an explicit congestion notification echo (ECE) may be sent to the sender.

19 Claims, 4 Drawing Sheets

(56) References Cited

OTHER PUBLICATIONS

Official Communication for U.S. Appl. No. 11/670,410 mailed May 29, 2009.
Official Communication for U.S. Appl. No. 11/670,410 mailed Dec. 30, 2009.
Official Communication for U.S. Appl. No. 11/670,410 mailed Mar. 19, 2010.
Official Communication for U.S. Appl. No. 11/670,410 mailed Sep. 24, 2010.
Official Communication for U.S. Appl. No. 11/670,410 mailed Jan. 21, 2011.
Official Communication for U.S. Appl. No. 11/670,410 mailed Dec. 6, 2011.
Official Communication for U.S. Appl. No. 11/670,410 mailed Jul. 9, 2012.
Official Communication for U.S. Appl. No. 11/670,410 mailed Oct. 12, 2012.

* cited by examiner

TCP THROUGHPUT CONTROL BY IMPOSING TEMPORAL DELAY

CROSS-REFERENCE TO RELATED APPLICATION

The present application is a Continuation of U.S. application Ser. No. 11/670,410 filed Feb. 1, 2007, entitled "TCP Throughput Control By Imposing Temporal Delay," the benefit of the earlier filing date of which is hereby claimed under 35 U.S.C. §120 and 37 C.F.R. §1.78, and which is further incorporated by reference.

BACKGROUND

This invention relates generally to network communications, and more particularly but not exclusively, to managing data flow rates over TCP using, in part, temporal delays in acknowledgements with possible Explicit Congestion Notification Echo (ECE) messages to perform data rate throttling.

Transmission Control Protocol/Internet Protocol (TCP/IP) is a well known mechanism used to facilitate the transmission of information between two or more computer systems via one or more networks. Network devices may employ the TCP/IP protocols to create connections with each other and exchange data using network packets. The TCP protocol is known as a connection-oriented protocol that was designed to guarantee reliable, in-order delivery of data.

TCP devices package the data into streams of bytes called segments which may be sent as individual IP datagrams. The TCP checks to make sure that no packets are lost by giving each segment a sequence number which numbers the bytes in the stream, and an acknowledgement number which tells a receiving network device the next expected sequence number, from which the last received sequence number may be intuited. When a network device transmits a TCP packet, it must wait a period of time for an acknowledgement. If the acknowledgement is not received within this period of time, the packet is assumed to be lost, and the packet is retransmitted.

However, networks such as the Internet are designed to support a diverse range of network devices and communication mediums, including such as a large scaled server devices, down to handheld portable devices. Clearly, faster network devices could readily transmit packets significantly faster than many of today's slower devices could accept. Similarly, various network mediums, and interconnect devices, may vary in their capabilities, including speed. Consider, for example, two similar end-point network devices, each employing a Ethernet Local Area Network (LAN), but with the two Ethernets being connected through a 28.8 Kbps modem link. In this configuration, the modem link could quickly become overwhelmed by network packets, should one of the end-point network devices select to transmit at Ethernet speeds.

Typically, control of the data over the network is managed indirectly by the receiver network device sending to the sending network device an advertised window size, called the receive window. The receiver's window size tells the sending network device how much data the receiving network device is prepared to receive. By indicating a large window, the receiver can encourage transmissions of packets. By indicating the maximum amount of data receivable, the sender network device may employ this information to then set its congestion window size to not exceed the receiver's advertised window.

However, often there is an intermediate device interposed between the sending network device and the receiving network device. Such intermediate devices may include a buffer that is configured to receive packets from the sending network device and to forward them to the receiving network device. However, if more data arrives at the intermediate device than can be accepted, some packets may be lost, resulting in traffic congestion. Too much data may also fill the intermediate's buffer, again resulting in potentially lost data. These actions may result in excessive retransmissions, and may add to the load of the network.

Alternatively, indicating a small window by the sending network device may restrict the transmission of data resulting in underutilization of the network and introducing a round trip delay between each packet segment transmitted. Moreover, once a window size is advertised to the other party, it cannot typically be reduced or reneged on (although it might be increased) until all associated data packets have been received. That is, a window size for data packets is not completely dynamic. Thus, dynamically managing data over the network by directly managing a window size may at times be frustrating. Therefore, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein a "network connection" is a collection of links and/or software elements that enable a computing device to communicate with another computing device over a network. One such network connection may be a TCP connection. TCP connections are virtual connections between two network nodes, and are typically established through a TCP handshake protocol. The TCP communications protocol is described in more detail in RFC 793, which is available at through the IETF. A network connection "over" a particular path or link refers to a network connection that employs the specified path or link to establish and/or maintain a communication.

Acknowledgements (ACKs) are one mechanism employed for use in establishing the reliability of the TCP communications protocol. Briefly, in one embodiment, a receiving computing device acknowledges the receipt of a correctly delivered network segment identified by a sequence number, within the TCP segment header. One acknowledgement scheme, known as positive acknowledgement, occurs when the receiving computing device acknowledges receipt of all correctly received segments by providing the sequence number of the next expected first byte of the segment. Moreover, the TCP communications protocol may employ control flags including an Acknowledgement (ACK) flag that may be sent in an Acknowledgement packet to the sending computing device to notify the sender that the receiving computing device has received all bytes up to but not including the one marked with the new sequence number. One embodiment of ACK flags is described in more detail in RFC 793, which is hereby incorporated by reference.

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The terms "sending device," "sender," and "sending network device," each refer to a network device that is configured to send data to a destination network device over a network. The terms, "receiver," "destination network device," and "receiving network device" each refer to a network device that is configured to receive data from a sending network device over the network. In many instances, another network device may be interposed between the sending network device and the receiving network device. Such interposed network device may be called an intermediate network device. It should be recognized that a network device may operate as a sending network device and/or as a receiving network device. Thus, for example, a first network device may operate to send data over the network to a second network device, and then receive data from the second network device.

Briefly stated, the invention is directed towards a system, apparatus, and method for managing traffic over a network by imposing temporal delays in the sending of acknowledgments (ACKs) by an intermediate network device, interposed between a sending network device and a receiving network device. By dynamically modifying when an ACK is sent in response to receiving a network packet, the invention may dynamically throttle a rate of flow of the traffic by modifying a round trip time (RTT) associated with the network traffic. In one embodiment, managing of the traffic flow is performed by monitoring how much data is stored in a traffic device, such as a Traffic Management Device (TMD), residing between the two network session end-points (herein called the sending network device and the receiving network device). A buffer for the intermediate device is monitored as network packets are received. If the contents of the buffer exceed a threshold value, delays are imposed on sending of acknowledgements. In one embodiment, the delays are imposed on bare acknowledgement packets. That is, those response packets that do not also include response data. In one embodiment, the delays for the acknowledgements may be ramped in over time. In another embodiment, the temporal delays may be stepped in, or even computed based on a desired relationship between a sender's round trip time (RTT), and a receiver's RTT. By modifying the temporal delay of the ACKs, the sending network device may then modify its own congestion window and/or network capacity using its internal mechanisms, where such mechanisms may include, for example, TCP-Vegas, Compound-TCP, or the like.

If the buffer contents exceed the threshold, and the buffer's contents are increasing, the temporal delays may be increased. If the buffer's contents are about at steady state, the acknowledgement temporal delays may be decreased, or maintained at a current temporal delay status. Where the buffer's contents are decreasing, in one embodiment, the acknowledgement delays may be decreased. In one embodiment, if the sender is sending packets at a rate above a receiver's ability to receive the packets, and the sender appears not to be decreasing its rate of transmission, an explicit congestion notification echo (ECE) may be sent to the sender to force a change in the sender's rate of transmission of packets.

Briefly, an ECE is a flag within a TCP/IP header that may be employed to inform a data sending computing device that a Congestion Experienced (CE) packet has been received. ECE flags are employed within the Explicit Congestion Notification (ECN) protocol described in more detail in RFC 3168, which is available through the Internet Engineering Task Force (IETF), and which is incorporated herein by reference. In one embodiment, the TCP protocol is configured to treat an ECN signal the same as when a single dropped network packet is detected, although the packet might not actually be dropped. That is, in one embodiment, the sending computing device may reduce its congestion window size (described in more detail in RFC 2001, which is incorporated herein by reference). However, the invention is not constrained to employing ECN signaling, and other mechanisms may also be employed, without departing from the scope of the invention.

Illustrative Operating Environment

Figure 1:
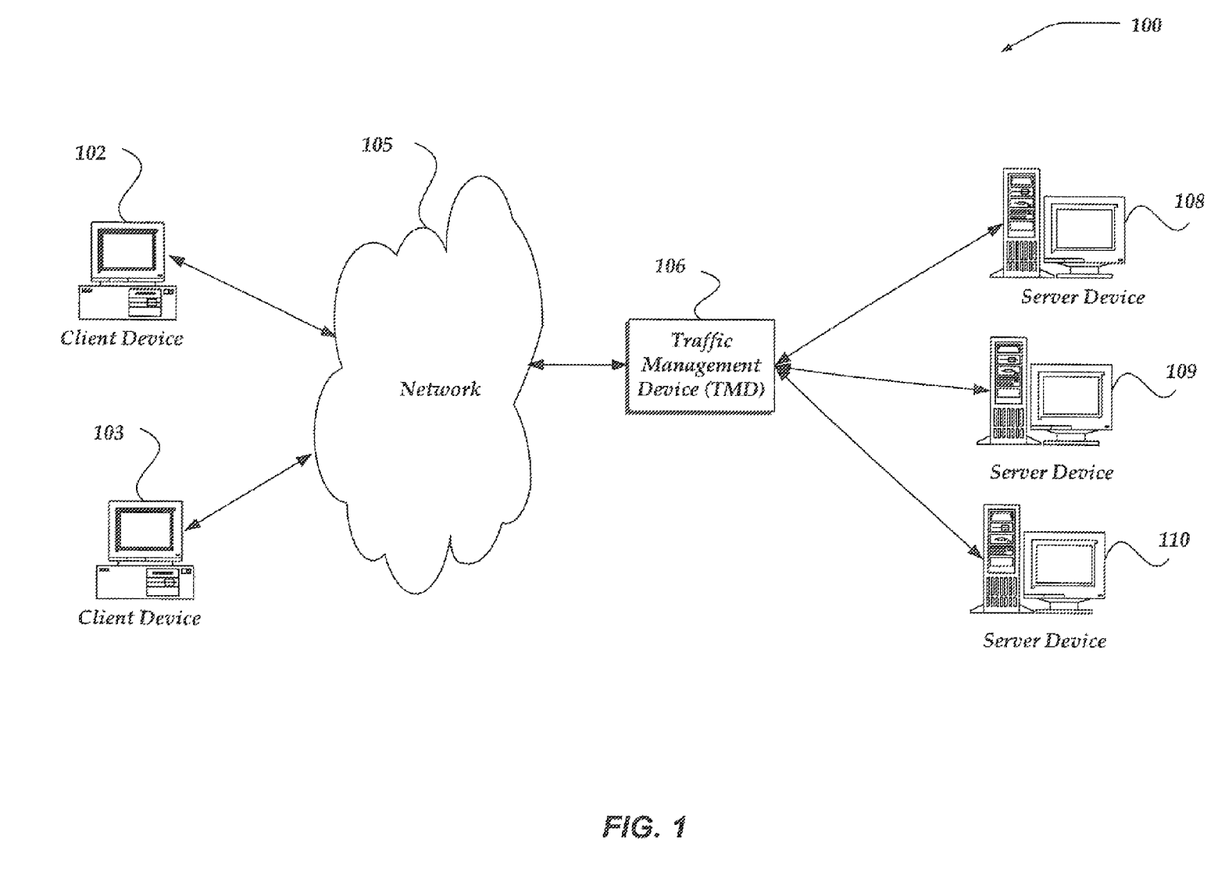
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-103, network 105, traffic management device (TMD) 106, and servers 108-110. Client devices 102-103 are in communication with TMD 106 through network 105. TMD 106 is in further communication with servers 108-110.

Generally, client devices 102-103 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-103 may also include other computing devices, such as personal computers, multiprocessor systems, microprocessor-based or programmable consumer electronics, network PCs, and the like. As such, client devices 102-103 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client devices 102-103 also may include at least one client application that is configured to receive content from another computing device. The client application may include a capability to provide and receive textual content, graphical content, audio content, alerts, messages, and the like. Moreover, client devices 102-103 may be further configured to communicate a message, such as through a Short Message Service (SMS), Multimedia Message Service (MMS), instant messaging (IM), internet relay chat (IRC), mIRC, Jabber, and the like, between another computing device, and the like.

In one embodiment, client devices 102-103 may include sites where an end-user operates the computing device to make requests for data and/or services from other computers on the network. Often, the requested data resides in computing devices such as servers 108-110. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, client devices 108-110 are computing devices that are not operated by an end-user. Moreover, the invention is not constrained to a client/server architecture, and other architectures may be employed, including, for example, a peer-to-peer architecture.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices, such as remote device 106 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TMD 106 is described in more detail below in conjunction with FIG. 2. Briefly however, TMD 106 includes virtually any device that manages network traffic.

Such devices include, for example, routers, proxies, firewalls, load balancers, cache devices, gateways, devices that perform network address translation (NATs), port translations, sequence translations, or the like, any combination of the preceding devices, and the like. Thus, in one embodiment, TMD 106 may inspect incoming network packets, and may perform an address translation, port translation, a packet sequence translation, and the like, and route the network packet based, at least in part, on the packet inspection.

In one embodiment, TMD 106 may perform a packet-by-packet content switching decision for client-side requests. Thus, TMD 106 may, for example, control the flow of data packets delivered to and forwarded from a server, such as servers 108-110. TMD 106 may direct a request to a particular server based on network traffic, network topology, capacity of a server, content requested, and a host of other traffic distribution mechanisms. TMD 106 may receive packets from and transmit packets to network 105, the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as web browsing, email, telephony, streaming multimedia and other traffic that is sent in packets.

TMD 106 may communicate with servers 108-110 and/or client devices 102-103 using any of a variety of network communication protocols, including TCP/IP, HTTP, as well as any of a variety of other connection-oriented protocols or the like. As such, TMD 106 may be configured to perform session setups, teardowns, sequencing, acknowledgements, keepalives, flow control, and the like, between itself and another network device. Moreover, TMD 106 may also be configured to manage connection aggregation wherein multiple client devices may be enabled to provide requests on a same server-side connection. TMD 106 may further open and manage a connection pool for connections with servers 108-110.

TMD 106 may be configured, in one embodiment, to manage the traffic between client devices 102-103 and server devices 108-110 using temporal delays in ACKs based on a buffer's content exceeding a threshold value. In one embodiment, the buffer is employed to store received network data by TMD 106, until TMD 106 can forward the network data towards its destination. In one embodiment, if the contents of the buffer exceed the threshold value, the TMD 106 may impose a temporal delay in sending of an ACK. TMD 106 may further continue to monitor the buffer's contents. In one embodiment, if the buffer's contents continue to grow, and the sending device's continues to transmit at a rate faster than the receiving device is able to consume the data, then TMD 106 may employ a variety of other mechanisms to decrease the rate in which the sending device is transmitting data. In one embodiment, TMD 106 may send an ECE signal to the sending device, indicating congestion exists, so that the sending device may reduce its rate of transmission of data. Moreover, in one embodiment, the ACK delays may be adjusted based on a desired relationship between a sender's round trip time (RTT), and a receiver's RTT. TMD 106 may, in one embodiment, employ a process substantially similar to that described below in conjunction with FIG. 4 to perform at least some of its actions.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. The BIG-IP® family of traffic managers, by F5 Networks of Seattle, Wash., are examples of TMDs.

Although FIG. 1 illustrates TMD 106 communicating with client devices 102-103 through network 105, the invention is not so limited. For example, TMD 106 may also employ another network (not shown) with which to communicate with servers 108-110. Moreover, either network 105, and/or the other network (not shown) may represent the Internet, an intranet, or the like.

In addition, as illustrated TMD 106 might be considered to be residing on a same networking infrastructure as servers 108-110. Such networking infrastructure may include, for example, a local area network (LAN), or the like. However, the invention is not constrained to this architecture. For example, TMD 106 may also reside on a same networking infrastructure as client devices 102-103, without departing from the scope or spirit of the invention.

Servers 108-110 may include any computing device capable of communicating packets with client devices 102-103 through TMD 106. Each packet may convey a piece of information. A packet may be sent for handshaking, e.g., to establish a connection or to acknowledge receipt of data. Thus, for example, the packet may include a synchronization (SYN) bit, an ACK bit, a finish (FIN) bit, or similar handshaking signals. The packet may include information such as a request, a response, or the like. Generally, packets received by servers 108-110 will be formatted according to TCP/IP, but they could also be formatted using another transport protocol, such as User Datagram Protocol (UDP), NETbeui, Stream Control Transmission Protocol (SCTP), token ring, and the like. Moreover, the packets may be communicated between servers 108-110, TMD 106, and client devices 102-103 employing HTTP, HTTPS, and the like.

In one embodiment, servers 108-110 are configured to operate as a website server. However, servers 108-110 are not limited to web servers, and may also operate as a messaging server, a File Transfer Protocol (FTP) server, a database server, a content server, and the like. Additionally, each of servers 108-110 may be configured to perform a different operation. Thus, for example, server 108 may be configured as a messaging server, while server 109 is configured as a database server. Moreover, while servers 108-110 may operate as other than a website, they may each still be enabled to receive an HTTP communication using TCP/IP, or the like.

Devices that may operate as servers 108-110 include personal computers desktop computers, multiprocessor systems, microprocessor-based or programmable consumer electronics, network PCs, servers, and the like.

Illustrative TMD Environment

Figure 2:
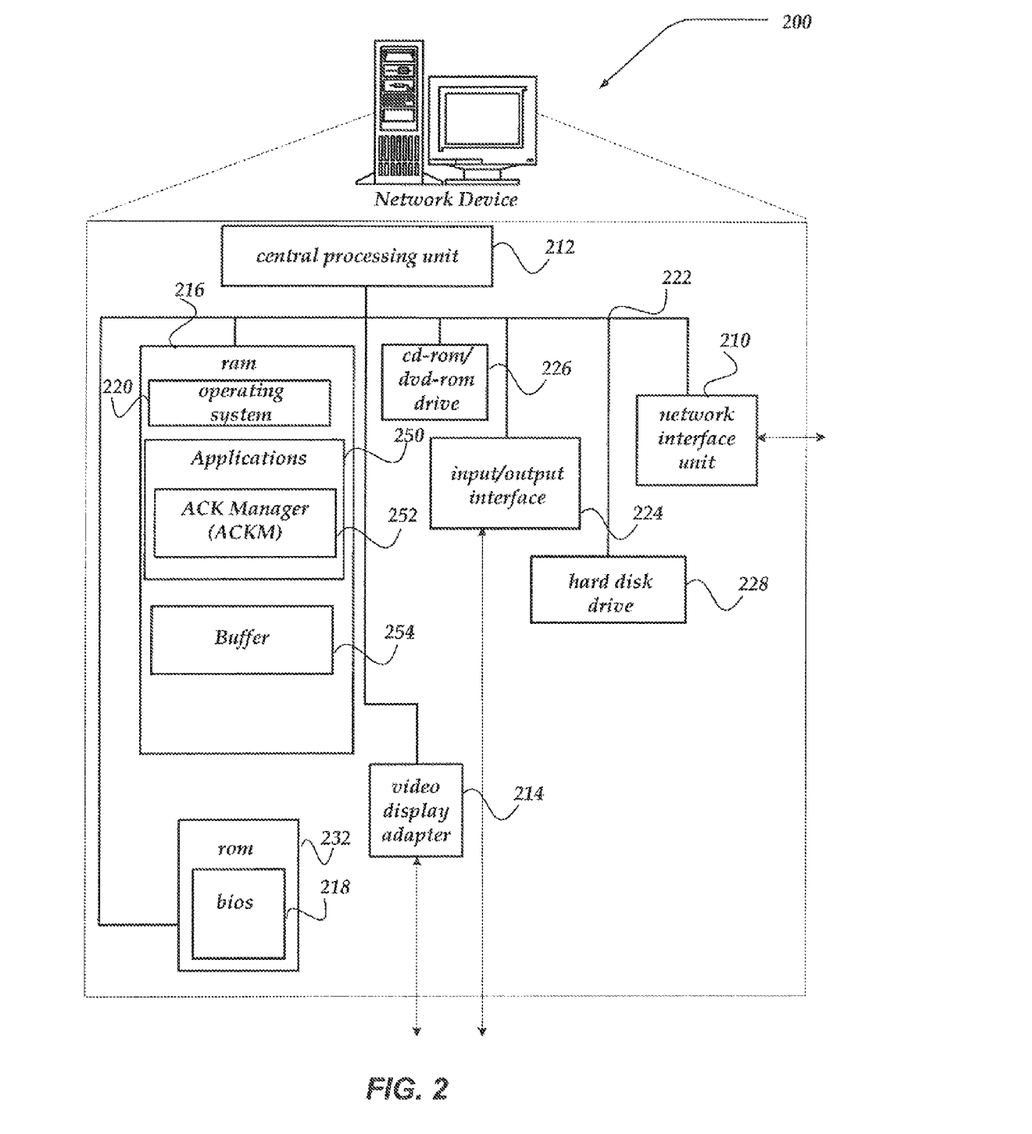
FIG. 2 shows a functional block diagram illustrating one embodiment of a network device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed.

As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, including CD-ROM/digital versatile disks (DVD-ROM) drive 226, or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, filtering programs, traffic management programs, schedulers, calendars, database programs, word processing programs, HTTP programs, security programs, and so forth. Mass storage may further include applications such as ACK Manager (ACKM) 252, and buffer 254.

Buffer 254 may represent any data storage medium configured receive and manage network packet data. Thus, buffer 254 may include allocated memory space, a program, a folder, or the like. In one embodiment, buffer 254 may represent a plurality of data storage mediums. For example, in one embodiment buffer 254 may represent a data storage medium for network packets received from a client device, such as client devices 102-103 of FIG. 1, and another data storage medium for network packets received from a server device, such as server devices 108-110, or the like. Moreover, although buffer 254 is illustrated in ram 316, the invention is not so limited. For example, buffer 254 may also reside within CD-ROM/digital versatile disks (DVD-ROM) drive 226, hard disk drive 228, or the like.

ACKM 252 is configured to manage traffic over a network between sending and receiving network devices by monitoring a receive buffer, such as buffer 254, and based, in part, on the contents in the buffer exceeding a threshold value, ACKM 252 may impose a delay in a transmission of an ACK. The delay may be ramped in, stepped in, or computed based on a sending network device's RTT and a receiving network device's RTT.

In one embodiment, ACKM 252 may determine that a rate of increase in the buffer's content is not decreasing substantially, and the sending network device is sending network packets at a rate above a receiver's defined rate of receiving the network packets. In such a situation, in one embodiment, ACKM 252 may select to send an ECE network packet to the sending network device. In any event, ACKM 252 may employ a process such as described below in conjunction with FIG. 4 to perform at least some of its actions.

Figure 3:
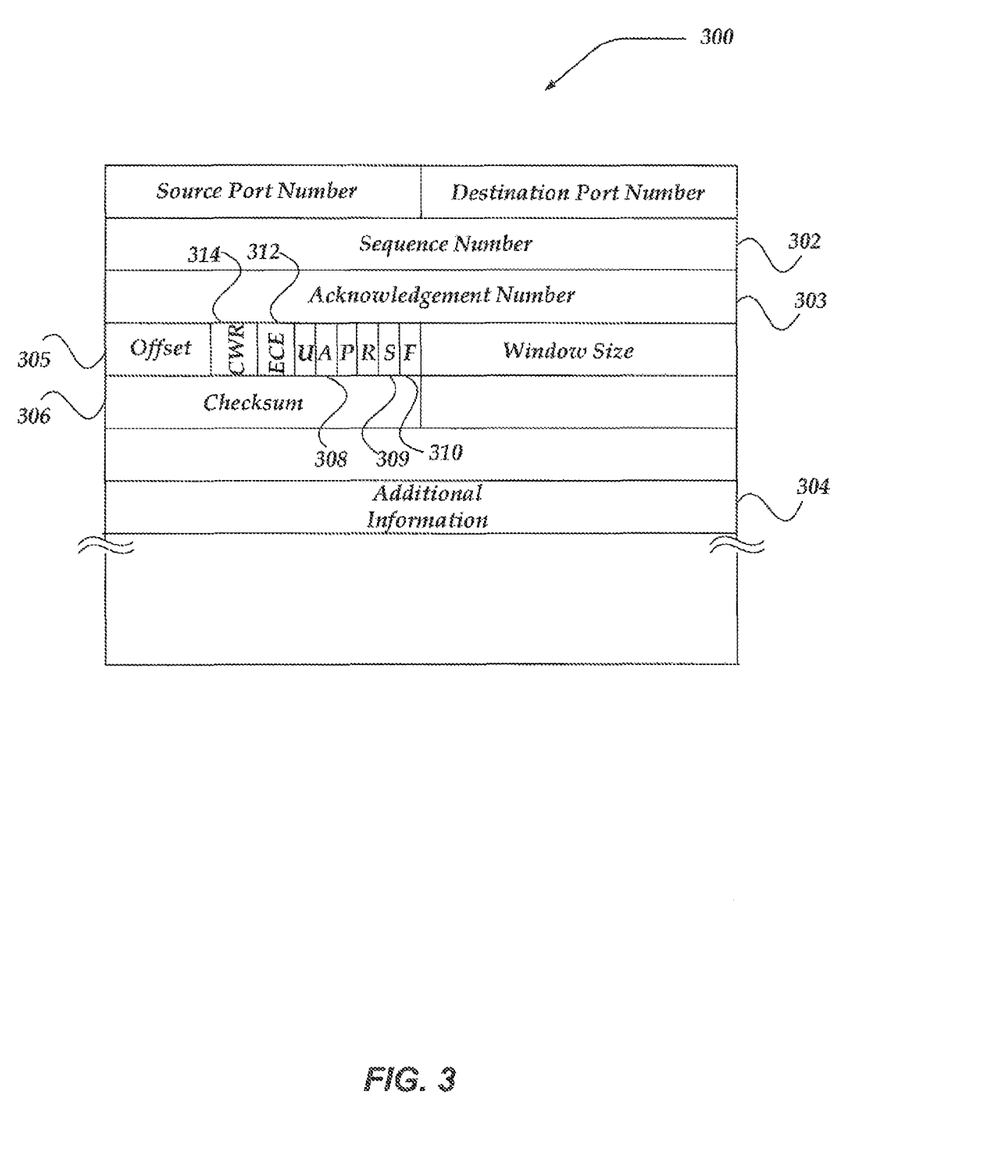
FIG. 3 illustrates a functional block diagram generally showing one embodiment of a portion of a Transmission Control Protocol (TCP) header with Explicit Congestion Notification (ECN) bits.

FIG. 3 illustrates a function block diagram showing one embodiment of a Transmission Control Protocol (TCP) header with use of ECN. Packet 300 may include many more or less components than those shown. The components shown, however, are sufficient to disclose an illustrative embodiment for practicing the invention. Although not illustrated, in one embodiment, an IP packet may also include ECN signals.

Packet 300 as shown includes sequence number 302, acknowledgement number 303, additional information 304, offset 305, checksum 306, ACK bit 308, SYN bit 309, and FIN bit 310. ACK bit 308, SYN bit 309, and FIN bit 310, each which illustrate one example of control flags for use in communicating TCP protocol signaling. As described herein, a SYN-ACK may be generated by setting both ACK bit 308 and SYN bit 309 within packet 300. In addition, packet 300 further includes a Congestion Window Reduced (CWR) flag 314, and an ECE flag 312.

Briefly, TCP communications may employ sequencing to keep track of data. Thus, sequence number 302 may be employed to identify the data transmitted over the network. In one embodiment, sequence number 302 may identify a first byte within a datagram being sent.

Acknowledgement number 303 may include a value that identifies a next sequence value a device expects to receive from another device. Acknowledgement number 303 is typically expected to represent a previously sent sequence number 302 plus a length value. In one embodiment, acknowledgement number 303 represents an implied acknowledgement.

Offset 305 may indicate where a start of an upper-layer data following the TCP header begins, while checksum 306 represents a value that may be used to detect bit damage that might have occurred during a transmission of the packet over the network.

ACK bit 308 may include one or more bits that might provide recognition of receipt of a previously received packet. SYN bit 309 may include one or more bits that may be employed to establish a session by, at least in part, synchronizing sequence numbers, or the like. Similarly, FIN bit 310 may include one or more bits that may be employable to close an established session and indicate that a sender has finished sending data.

When a receiving network device receives a data segment, it typically checks that the data segment was received in order. If the received data segment is correctly received, the receiving network device may send a network packet with ACK bit 308 set to indicate that the network packet is an Acknowledgement packet. The ACK packet notifies the sending network device that the receiving network device received all bytes up to but not including the one marked with the new sequence number identified in sequence number 302.

When a sending network device determines that a dropped data segment has occurred, based, for example, on not receiving an ACK packet, the sending network device may resend the data segment. Moreover, the sending network device may further adjust its transmission rate of network packets. Thus, by delaying sending of ACKs, the present invention may affect a RTT for the sending network device.

ECE 312 and CWR 314 are bits employed in Explicit Congestion Notification, as described in RFC 3168. Briefly, ECN is an Active Queue Management (AQM) mechanism to detect and provide support to congestion management. In one embodiment, network devices may employ ECN signals within TCP/IP headers, such as packet 300, to notify other network devices of incipient network congestion. Typically, when an ECE 312 bit is set in a network packet, the network device respond similar to when a single dropped packet is detected, however, the packet might not actually be dropped, in one embodiment. In one embodiment, the ECE 312 bit may be set in an Acknowledgement packet. In one embodiment, the network device receiving the ECE 312 bit may reduce its congestion window size, in response. Moreover, the network device may then send a network packet to the receiving network device, with the CWR 314 bit set to indicate that an action has been taken.

Generalized Operation

Figure 4:
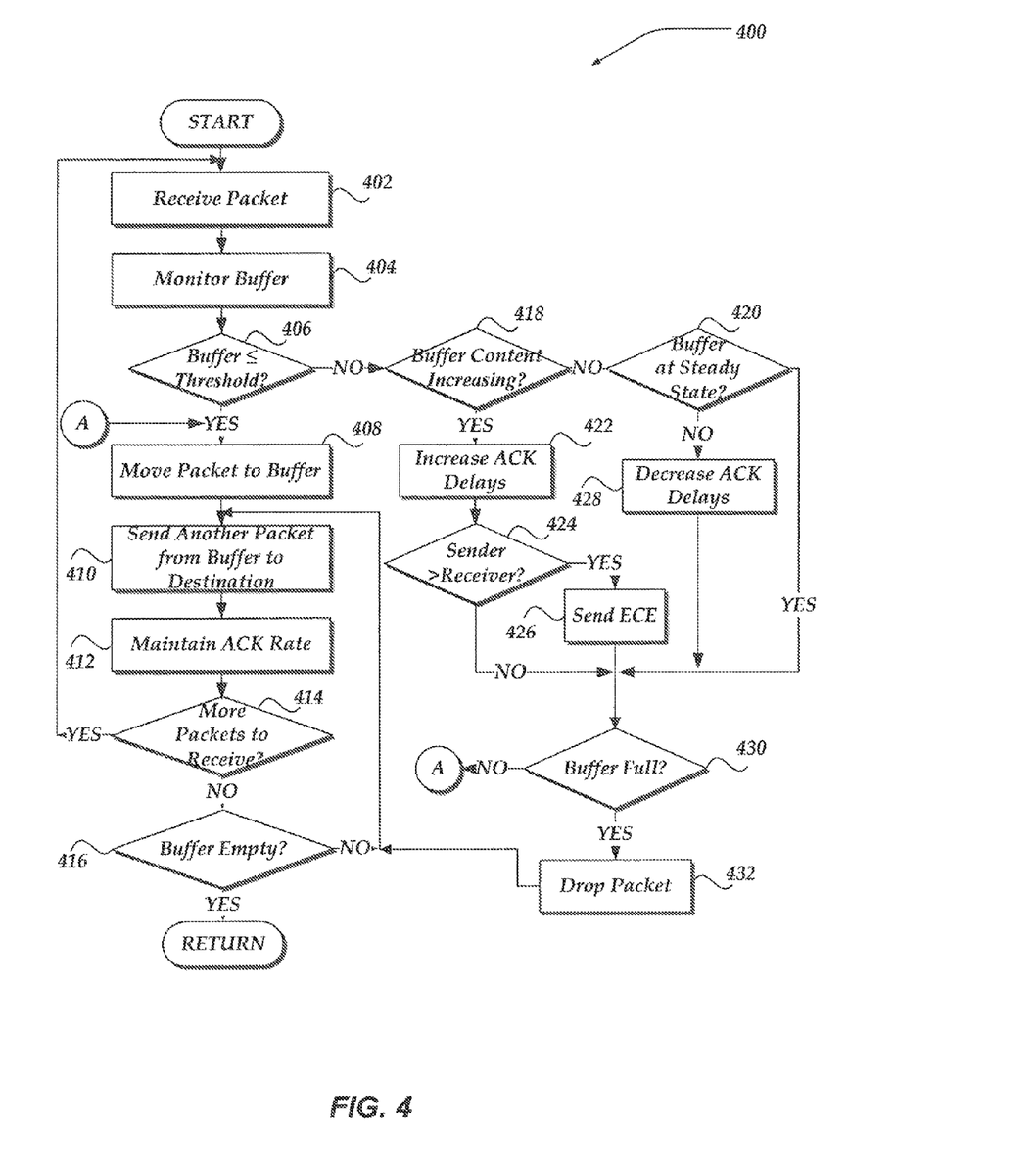
FIG. 4 illustrates a logical flow diagram generally showing one embodiment of an overview process for managing a network communications by imposing temporal delays on acknowledgement packets, in accordance with various embodiments.

The operation of certain aspects of the present invention will now be described with respect to FIG. 4. FIG. 4 illustrates a logical flow diagram generally showing one embodiment of an overview process for managing a network communications by imposing temporal delays on acknowledgement packets by an intermediate device, such as TMD 106 of FIG. 1. Process 400 of FIG. 4 may be implemented within TMD 106 of FIG. 1.

Process 400 begins, after a start block, at block 402, where a network packet is received, by a network device interposed between a sending network device and a receiving network device. Processing flow to block 404 where the intermediate network device employs a buffer for use in managing received network packets. Such network packets may be removed, and in one embodiment, modified, for transmission to a destination network device. Thus, monitoring of the buffer is directed towards ensuring that the buffer's contents do not exceed the size of the buffer. One embodiment, of monitoring may include monitoring to detect if the buffer's contents exceed a defined threshold value. In another embodiment, monitoring may further include monitoring a rate of change of the buffer's contents.

Thus, processing proceeds to decision block 406, to determine whether the buffer's contents are less than or equal to the defined threshold value. In one embodiment, the defined threshold value may be defined as some percentage of the buffer's size. In another embodiment, the defined threshold value may be determined dynamically based on a characteristic of the network packets received, a type of data in the network packets, a rate of change of the buffer's contents, or the like. In any event, if it is determined that the buffer's contents are less than or equal to the defined threshold value, processing flows to block 408; otherwise, processing branches to decision block 418.

At block 408, the received network packet is moved into the buffer. Processing then continues to block 410, where a network packet in the buffer is sent to the destination network device. In one embodiment, the buffer may be configured as a First In-First out (FIFO) buffer. Thus, the network packet send to the destination network device may be an earlier received network packet. Processing then continues to block 412, where a current temporal delay rate of providing ACK packets is maintained. Thus, in one embodiment, where the ACKs may be sent after a defined time delay, immediately, or the like, such temporal delay rate may be continued to be employed at block 412. Thus, in one embodiment, after a current temporal delay, the ACK for the network packet received at block 402 may be sent. Moreover, in one embodiment, a rate of temporal delay of the ACKs may be associated with bare ACKs, that is, those response network packets that do not include response data to a network request.

Processing flows next to decision block 414 where a determination is made whether more network packets are to be received. In one embodiment, this may be determined based on information associated with the received network packets.

In any event, if more packets are to be received, processing loops back to block 402; otherwise, processing flows to decision block 416, to determine whether the buffer is empty.

If the buffer is not empty of received network packets, then processing loops back to block 410, to continue to sending packets to the destination network device, until the buffer is empty. When the buffer is empty, processing may return to a calling process to perform other actions.

However, at decision block 406, where the buffer's contents exceed the defined threshold, processing flowed to decision block 418, where a determination is made whether the buffer's contents are increasing. If it is determined that the buffer's contents are increasing, indicating that network packets are being received at a rate that is higher than a sending rate of the network packets, then processing flows to block 422; otherwise, processing flows to decision block 420.

At block 422, a rate of ACK temporal delays may be increased, from a current temporal delay rate of sending ACKs. Increasing ACK temporal delays may be achieved using any of a variety of mechanisms, including, for example, ramping a temporal delay rate, stepping in an ACK temporal delay rate, or even computing a temporal delay rate based on a desired network packet sender's RTT. Moreover, in one embodiment, ACK delays may be based on some ACKs, and not other ACKs. Thus, for example, ACK temporal delays may be associated, in one embodiment, with bare ACKS (ACKS not included within a network packet that also includes a data payload).

Processing then flows to decision block 424 where a determination is made whether the sending network device is sending network packets at a rate that is higher than a rate that the receiving network device is advertising its ability to receive network packets. As such, decision block 424 may indicate that a receiving network device's RTT is higher than a sending network device's RTT. Moreover, in one embodiment, decision block 424 may also make a determination whether the ACK delays are greater or equal to a retransmission timeout (RTO) threshold value. If one or more of these are the case, processing flows to block 426; otherwise, processing instead flows to decision block 430.

At block 426, in one embodiment, an ECE bit may be set in a network packet sent to the sending network device to indicate that network congestion is detected. However, the invention is not constrained to employing ECN signaling, and other mechanisms may also be employed, without departing from the scope of the invention. For example, in another embodiment, a Domain Specific Access Control Restriction (DSACR) mechanism may also be employed to manage the sending network device's RTT, and through the RTT, among other things, network congestion. In any event, processing then flows to decision block 430.

At decision block 430 at determination is made whether the buffer is substantially full. A substantially full buffer may be based on a second threshold value that may, for example, indicate that the buffer presently is unable to store more network packets. If the buffer is determined to be substantially full, processing may flow to block 432, where the received network packet may be dropped. Processing then flows to block 410 as described above. If, however, the buffer is not substantially full, processing may branch to block 408.

Continuing the flow above, from decision block 418, if it is determined that the buffer's contents are not increasing, then processing flows to decision block 420, where a determination is made whether the buffer's contents are substantially at steady state. Steady state may be represented, in one embodiment, the contents of the buffer exhibit negligible change in growth and/or decay over a period of time. Thus, if the buffer's contents are substantially at steady state, rather than substantially increasing or decreasing, processing flows to decision block 430 described above. Alternatively, if the buffer's contents are not substantially at steady state, such as where the contents may be substantially decreasing, then process 400 flows to block 428.

At block 428, the temporal delay in transmitting ACKs is decreased. Decreasing ACK temporal delays may be achieved using any of a variety of mechanisms, including, for example, ramping down a temporal delay rate, stepping down an ACK temporal delay rate, or even computing a temporal delay rate based on a desired network packet sender's RTT. Moreover, in one embodiment, ACK temporal delays may be based on some ACKs, and not other ACKs. Thus, for example, ACK temporal delays may be associated, in one embodiment, with bare ACKS (ACKS not included within a network packet that also includes a data payload). In any event, processing then flows to decision block 430.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a communications between devices, comprising:
   a buffer for use in receiving and storing packets; and
   one or more physical devices operative to perform actions comprising:
      receiving a packet from a sending device;
      when it is determined that contents of the buffer are above a threshold value and
   also that the contents of the buffer are increasing, then selectively increasing a delay in sending of an acknowledgement (ACK) to the sending device;
      when it is determined that both the contents of the buffer are above the threshold value and the contents of the buffer is decreasing, then selectively decreasing the delay of sending the ACK to the sending device; and
      when it is determined that the contents of the buffer are substantially increasing above the threshold value and a round trip time for the sending device is less than a round trip time for a destination device, selectively sending an explicit congestion notification echo (ECE) to the sending device.

2. The network device of claim 1, wherein the one or more physical devices operative to perform actions comprising:
   when it is determined that the contents of the buffer are substantially increasing above the threshold value and the ACK delays are equal to or greater than a retransmission timeout (RTO) threshold value, then sending and ECE to the sending device.

3. The network device of claim 1, wherein the one or more physical devices operative to perform actions comprising:
   when it is determined that the contents of the buffer are substantially increasing above the threshold value and the sending device is sending packets at a rate that is higher than a rate that the destination device is advertising as its ability to receive packets, then sending an ECE to the sending device.

4. The network device of claim 1, wherein selectively decreasing or increasing the delay of sending the ACK further comprises one of adjusting a temporal delay based on a relationship between a round trip time for packets for the sending device and a round trip time for packets for the destination device.

5. The network device of claim 1, wherein selectively decreasing or increasing sending of an ACK further comprises selectively modifying temporal delays associated with ACKs not included within a packet that also includes a data payload.

6. The network device of claim 1, wherein selectively increasing or decreasing sending of an ACK further comprises employing one of stepping a modification of a temporal delay for sending the ACK, or ramping the modification of the temporal delay for sending the ACK.

7. The network device of claim 1, wherein the one or more physical devices operative to perform actions further comprising: when it is determined that the buffer is substantially full based on a second threshold, dropping the received packet.

8. A processor-based method operating on a network device, comprising:
   receiving a packet from a sending device at the network device, the packet being intended for a destination device;
   when it is determined that contents of a buffer are above a threshold value and also that the contents of the buffer are increasing, then selectively increasing a delay in sending of an acknowledgement (ACK) to the sending device;
   when it is determined that both the contents of the buffer are above the threshold value and the contents of the butler is decreasing, then selectively decreasing the delay of sending the ACK to the sending device; and
   when it is determined that the contents of the buffer are substantially increasing above the threshold value and a round trip time for the sending device is less than a round trip time for the destination device, selectively using a Domain Specific Access Control Restriction (DSACR) to control a round trip time of the sending device.

9. The processor-based method of claim 8, further comprising:
   when it is determined that the contents of the buffer are substantially increasing above the threshold value and the ACK delays are equal to or greater than a retransmission timeout (RTO) threshold value, then sending an explicit congestion notification echo (ECE) to the sending device.

10. The processor-based method of claim 8, further comprising:
when it is determined that the contents of the buffer are substantially increasing above the threshold value and the sending device is sending packets at a rate that is higher than a rate that the destination device is advertising as its ability to receive packets, then sending an explicit congestion notification echo (ECE) to the sending device.

11. The processor-based method of claim 8, wherein selectively decreasing or increasing the delay of sending the ACK further comprises one of adjusting a temporal delay based on a relationship between a round trip time for packets for the sending device and a round trip time for packets for the destination device.

12. The processor-based method of claim 8, wherein selectively decreasing or increasing sending of an ACK further comprises selectively modifying temporal delays associated with ACKs not included within a packet that also includes a data payload.

13. The processor-based method of claim 8, wherein selectively increasing or decreasing sending of an ACK further comprises employing one of stepping a modification of a temporal delay for sending the ACK, or ramping the modification of the temporal delay for sending the ACK.

14. An apparatus comprising a non-transitory computer readable medium, having computer-executable instructions stored thereon, that in response to execution by a computing device interposed between a sending device and a destination device enables the interposed computing device to perform actions, comprising:
receiving a packet from the sending device;
when it is determined that contents of a buffer are above a threshold value and also that the contents of the buffer are increasing, then selectively increasing a delay in sending of an acknowledgement (ACK) to the sending device;
when it is determined that both the contents of the buffer are above the threshold value and the contents of the buffer is decreasing, then selectively decreasing the delay of sending the ACK to the sending device; and
when it is determined that the contents of the buffer are substantially increasing above the threshold value and a round trip time for the sending device is less than a round trip time for the destination device, selectively sending an explicit congestion notification echo (ECE) to the sending device.

15. The apparatus of claim 14, wherein the computing device performs actions, further including:
when it is determined that the contents of the buffer are substantially increasing above the threshold value and the ACK delays are equal to or greater than a retransmission timeout (RTO) threshold value, then sending an ECE to the sending device.

16. The apparatus of claim 14, wherein the computing device performs actions, further including:
when it is determined that the contents of the buffer are substantially increasing above the threshold value and the sending device is sending packets at a rate that is higher than a rate that the destination device is advertising as its ability to receive packets, then sending an ECE to the sending device.

17. The apparatus of claim 14, wherein selectively decreasing or increasing the delay of sending the ACK further comprises one of adjusting a temporal delay based on a relationship between a round trip time for packets for the sending device and a round trip time for packets for the destination device.

18. The apparatus of claim 14, wherein selectively decreasing or increasing the sending of an ACK further comprises selectively modifying temporal delays associated with the ACKs not included within a packet that also includes a data payload.

19. The apparatus of claim 14, wherein selectively increasing or decreasing sending of an ACK further comprises employing one of stepping a modification of a temporal delay for sending the ACK, or ramping the modification of the temporal delay for sending the ACK.

* * * * *